Aug. 17, 1926.

F. W. HALL 1,596,655

VALVE FOR CORNETS AND THE LIKE

Filed August 13, 1925

Inventor.
Frank W. Hall.

Attorney.

Patented Aug. 17, 1926.

1,596,655

UNITED STATES PATENT OFFICE.

FRANK W. HALL, OF EAGLE ROCK CITY, CALIFORNIA.

VALVE FOR CORNETS AND THE LIKE.

Application filed August 13, 1925. Serial No. 49,911.

This invention has to do generally with valves for cornets and the like, and its general object is to provide a valve action which is exceedingly light and yet positive and sure in action.

So far as I am aware, all valve actions heretofore have depended upon a single spring so applied against the valve plunger that the latter is normally yieldably held at the limit of its upward stroke, the plunger being manually depressed against the action of this spring when the valve is to be operated.

Such an assembly has the following inherent disadvantages: If the single spring be sufficiently strong to always insure rapid and complete return of the plunger to normal, it must be so strong that it requires excessive pressure to operate it; on the other hand, if the spring be so light that it requires relatively little pressure to compress it, the valve plunger sticks down if it is the least bit out of true or if there is the smallest accumulation of foreign matter in the valve.

I have overcome these difficulties by the use of two light springs, both being adapted to hold the plunger normally and yieldably at the limit of its upward stroke, but being applied to the plunger at points longitudinally spaced therealong, preferably at or near the plunger top and bottom.

The total effective strength of the two springs may be less than that of the single spring used heretofore, due to the described distribution or two-point application of spring pressure, with the result that the valve action is exceedingly light and quickly responsive.

I find that with the springs thus applied, the plunger does not stick at the bottom, as it is so prone to do when a single spring is used, and that very little lubrication is required to insure smooth plunger movement.

Ordinarily, I find the best results are obtained by making the spring beneath the plunger a little lighter than the top spring, though this is in no way to be considered as inferring that such a differential is essential to the invention, considered in its broader aspects. In fact, the relative characteristics of the two springs may be varied (either by adjusting the springs or by the choice of springs) to suit the individual tastes of given musicians.

Furthermore, in the event of the failure of one spring, the other spring continues to function, thus saving the operator from an embarrassing situation, as will be readily understood.

Other objects and novel features of the invention will be made apparent in the following detailed description, reference being made to the accompanying drawings, in which.

Figure 1:
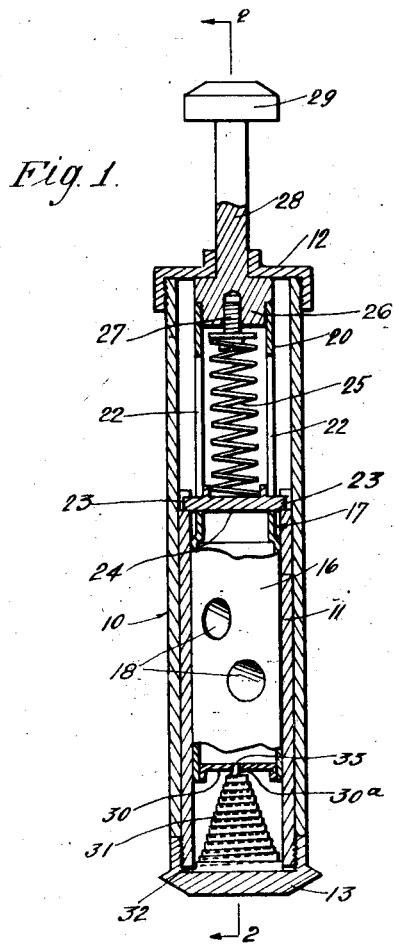
Fig. 1 is a medial, longitudinal sectional view of a valve assembly embodying my invention, the plunger being shown partly in elevation.
Figure 2:
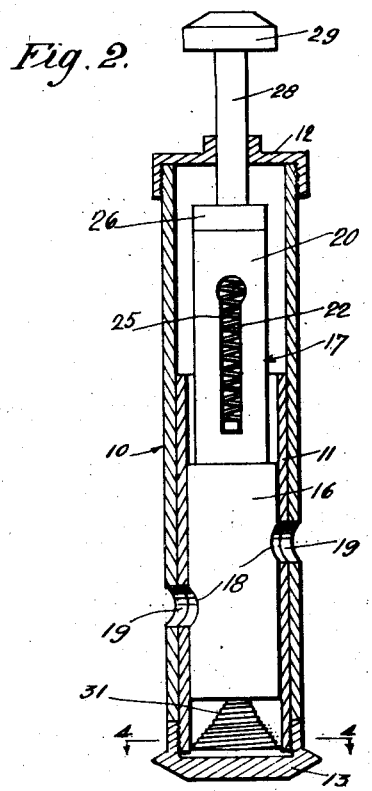
Fig. 2 is a section on line 2—2 of Fig. 1, but showing the plunger in changed position.
Figure 3:
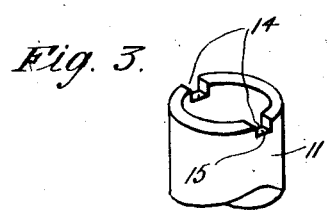
Fig. 3 is a fragmentary perspective of the upper end of the cylinder liner.
Figure 4:
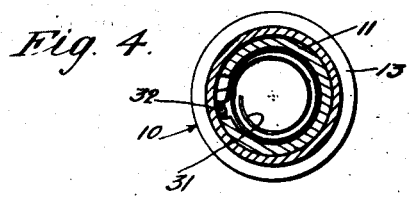
Fig. 4 is a section on line 4—4 of Fig. 1.

I will first describe the typical valve illustrated, but it is not to be inferred that my invention is limited to application to this particular valve, the showing being made merely to illustrate clearly how the invention may be embodied in one type of valve, whereupon it will be evident to those skilled in the art how it may be embodied in other types.

Numeral 10 indicates a tubular valve casing or cylinder having a liner 11 rigidly fixed thereto, removable caps 12 and 13 being adapted to close the upper and lower ends, respectively. Liner 11 has two diametrically opposed notches 14 on its upper end, said notches providing upwardly facing shoulders 15 for a purpose to be later made apparent.

The body portion 16 of plunger 17 is adapted to reciprocate vertically through liner 11 in a manner to bring body ports 18 into and out of register with cylinder ports 19 in the usual manner. The plunger has a spring barrel 20 provided with diametrically opposed and longitudinally extending slots 22 through which arms 23 of plate 24 extend. The arms are entered in notches 14, thereby holding the plunger against rotary movement within the cylinder and limiting the downward movement of the plate, said plate thus being adapted to function as a stationary, cylinder-carried stop for spring 25; the latter being retained in barrel 20 by removable head 26 from which may depend a spring tension adjusting screw 27. Head 26 carries valve stem 28 which is tipped by finger piece 29. It will be evident from the above that spring 25 acts between plate 24 and head 26 (the latter may be considered a downwardly facing shoulder on the plunger) to hold the plunger normally and yieldably at the limit of its upward movement as determined by the engagement of head 26 with cap 12.

The mechanism so far described is usual to a known type of valve, spring 25 being the single means for holding the plunger to normal and returning it thereto after manual depression. The assembly has the inherent defects set out in the introductory remarks, and they therefore need not be repeated here.

In carrying out my invention, I provide a spring 25 which is preferably considerably lighter than that usual to valve actions of this type, but between the lower end or downwardly facing shoulder 30 of plunger body 16, and cap 13 I interpose a second coil spring 31. Spring 31 is accessible when a cap 13 is removed, and, if desired, the spring may be secured to the cap by any suitable clip or by a drop of solder 32, though I do not find it necessary to so fasten the spring and do not wish it to be inferred that my claims are in any way limited to such a feature.

While spring 31 may be of any suitable type, I find a flat, coiled spring of the conical or telescopic type illustrated, is especially well suited to the purpose. By passing the upwardly bent tip 33 of spring 31 through central aperture 30$^a$ in plunger end 30, the spring serves to center the plunger in the cylinder, to obvious advantage; a flat spring being especially efficient in this regard since its coils vertically overlap even when extended and therefore cannot pass each other horizontally.

Spring 31 urges the plunger upwardly as does spring 25, and it is found that this distribution of spring force along the longitudinal extent of the plunger, does much to insure smooth, fast action of the valve and prevents it from sticking should foreign matter accumulate. Consequently, the springs may both be relatively light with a resulting decrease in the manual pressure required to depress the plunger.

For ordinary purposes, I find it to be of advantage to make the lower spring a little weaker than the upper spring, though this differential is not to be considered as limitative on the invention. Springs of varying effective strength may be chosen to meet the varying requirements or tastes of individuals.

It will be understood the drawings and description are to be considered merely as illustrative of and not restrictive on the broader claims appended hereto, for various changes in design, structure and arrangement may be made without departing from the spirit and scope of said claims.

I claim:

1. In a valve for cornets and the like, a cylinder, a valve plunger fitted to slide longitudinally therein, and a pair of springs within the cylinder, both springs being applied to the plunger in a manner to urge it longitudinally and yieldably in a given direction, the points of spring application being longitudinally spaced along the plunger.

2. In a valve for cornets and the like, a cylinder, a valve plunger fitted to slide longitudinally therein, and a pair of springs within the cylinder, both springs being applied to the plunger in a manner to urge it longitudinally and yieldably in a given direction.

3. In a valve for cornets and the like, a cylinder, a valve plunger fitted to slide longitudinally therein, and a pair of springs within the cylinder, both springs being applied to the plunger in a manner to urge it longitudinally and yieldably in a given direction, the points of spring application being near the opposite ends of the plunger.

4. In a valve for cornets and the like, a cylinder, a valve plunger fitted to slide longitudinally therein, a pair of longitudinally spaced downwardly facing shoulders on the plunger, a pair of springs in the cylinder, the lower end of each spring being supported by the cylinder, the upper end of one spring engaging one of said downwardly facing shoulders, and the upper end of the other spring engaging the other of said downwardly facing shoulders; all in a manner whereby both springs longitudinally and yieldably urge said plunger in a given direction.

5. In a valve for cornets and the like, a cylinder, a valve plunger fitted to slide longitudinally therein, and a pair of springs within the cylinder, both springs being applied to the plunger in a manner to urge it longitudinally and yieldably in a given direction, the points of spring application being longitudinally spaced along the plunger, said springs being of different effective strengths.

6. In a valve for cornets and the like, a cylinder, a valve plunger fitted to slide longitudinally therein, and a pair of springs within the cylinder, both springs being applied to the plunger in a manner to urge it longitudinally and yieldably in a given direction; one of said springs being applied to the plunger bottom and having a centering tip entered in a central aperture provided in said bottom.

7. In a valve for cornets and the like, a cylinder, a valve plunger fitted to slide longitudinally therein, and a pair of springs within the cylinder, both springs being applied to the plunger in a manner to urge it longitudinally and yieldably in a given direction; one of said springs being applied to the plunger bottom, said one spring being a coiled spring of the conical type and having a centering tip adapted to enter a central aperture provided in said bottom.

8. In a valve for cornets and the like, a cylinder, a valve plunger fitted to slide longitudinally therein, and a pair of springs within the cylinder, both springs being applied to the plunger in a manner to urge it longitudinally and yieldably in a given direction; one of said springs being applied to the plunger bottom and being adapted to center the plunger in the cylinder.

9. In a valve for cornets and the like, a cylinder, a valve plunger fitted to slide longitudinally therein, and a pair of springs within the cylinder, both springs being applied to the plunger in a manner to urge it longitudinally and yieldably in a given direction; one of said springs being applied to the plunger bottom, said one spring being a flat, coil spring of the conical type.

10. In a valve for cornets and the like, a cylinder, a valve plunger fitted to slide longitudinally therein, and a pair of springs within the cylinder, both springs being applied to the plunger in a manner to urge it longitudinally and yieldably in a given direction; one of said springs being applied to the plunger bottom, said one spring being a flat, coil spring of the conical type, the coils of the spring being held in overlapping relative position when the spring is extended.

In witness that I claim the foregoing I have hereunto subscribed my name this 25th day of July 1925.

FRANK W. HALL.